United States Patent
Koike

(10) Patent No.: US 8,842,202 B2
(45) Date of Patent: Sep. 23, 2014

(54) MOBILE TERMINAL, METHOD FOR ADJUSTING MAGNIFICATION OF CAMERA AND PROGRAM

(71) Applicant: NEC CASIO Mobile Communications, Ltd., Kawasaki (JP)

(72) Inventor: Satoshi Koike, Kanagawa (JP)

(73) Assignee: NEC Casio Mobile Communications Ltd., Kanagawa (JP)

( * ) Notice: Subject to any disclaimer, the term of this patent is extended or adjusted under 35 U.S.C. 154(b) by 50 days.

(21) Appl. No.: 13/648,814

(22) Filed: Oct. 10, 2012

(65) Prior Publication Data

US 2014/0098264 A1   Apr. 10, 2014

(51) Int. Cl.
*H04N 5/262* (2006.01)

(52) U.S. Cl.
CPC ..................... *H04N 5/262* (2013.01)
USPC ................ 348/240.99; 348/240.1; 348/240.2; 348/240.3; 348/211.9

(58) Field of Classification Search
USPC ........ 348/240.99, 240.1, 240.2, 240.3, 211.9, 348/239
See application file for complete search history.

(56) References Cited

U.S. PATENT DOCUMENTS 8,314,832 B2 * 11/2012 Mann et al. ...................... 348/51
2004/0100563 A1 * 5/2004 Sablak et al. .............. 348/211.4

FOREIGN PATENT DOCUMENTS

| JP | 09-149311 A | 6/1997 |
| JP | 2006-186658 A | 7/2006 |
| JP | 2008-097599 A | 4/2008 |
| JP | 2008-108246 A | 5/2008 |
| JP | 2009-236843 A | 10/2009 |
| JP | 2010-066389 A | 3/2010 |

* cited by examiner

*Primary Examiner* — Yogesh Aggarwal
(74) *Attorney, Agent, or Firm* — Sughrue Mion, PLLC

(57) ABSTRACT

To provide a mobile terminal, a method for adjusting the magnification of a camera and a program that enable a photographer, who shoots an image using a display screen, to easily see an image displayed on the display screen. A mobile terminal including a camera and a display screen comprises: a display control section that displays an image of an object picked up by the camera on the display screen; a detecting section that detects a photographer's eye position with respect to the display screen and measures a distance from the eye position to the display screen; a measuring section that measures a distance from the camera to the object; and an adjusting section that adjusts a magnification of the camera on the basis of the distance measured by the detecting section and the distance measured by the measuring section.

6 Claims, 4 Drawing Sheets

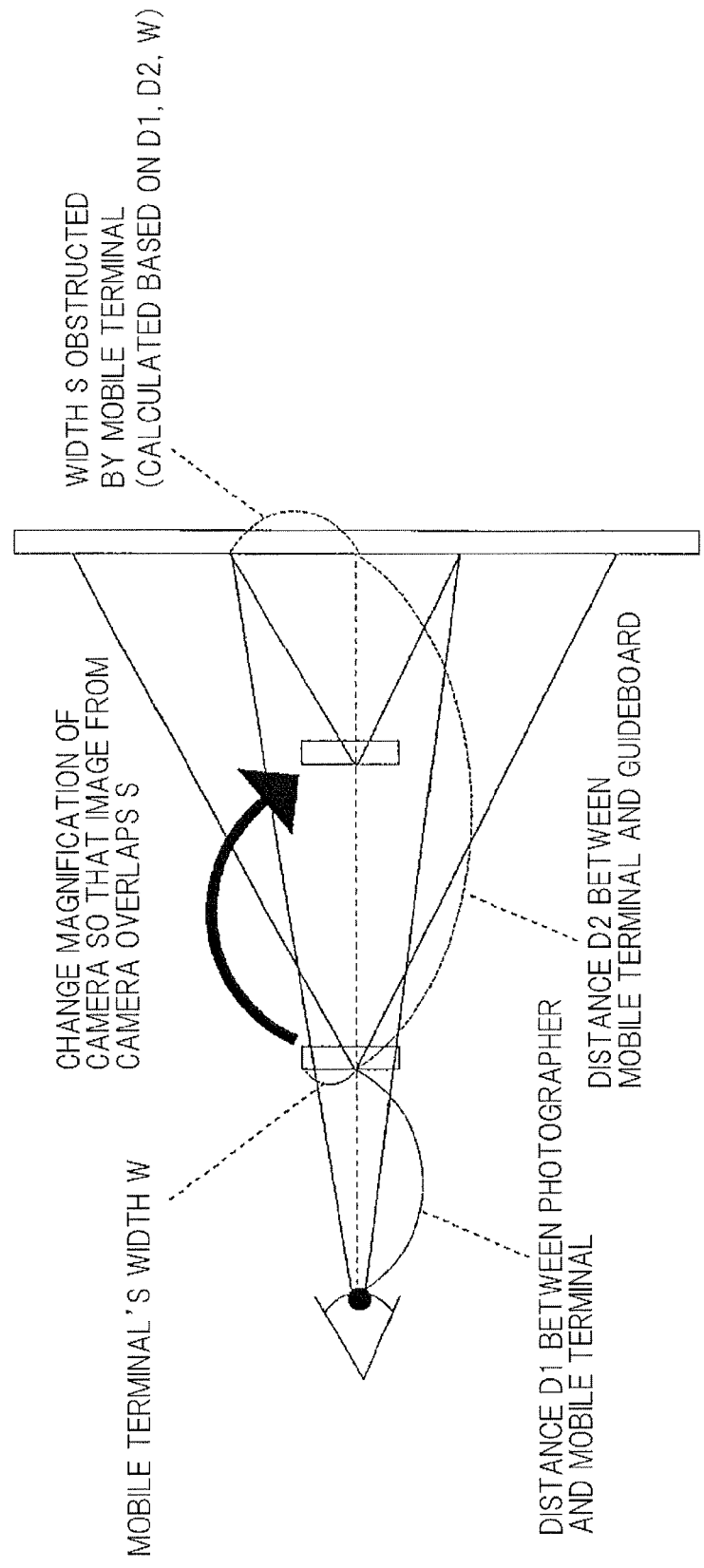

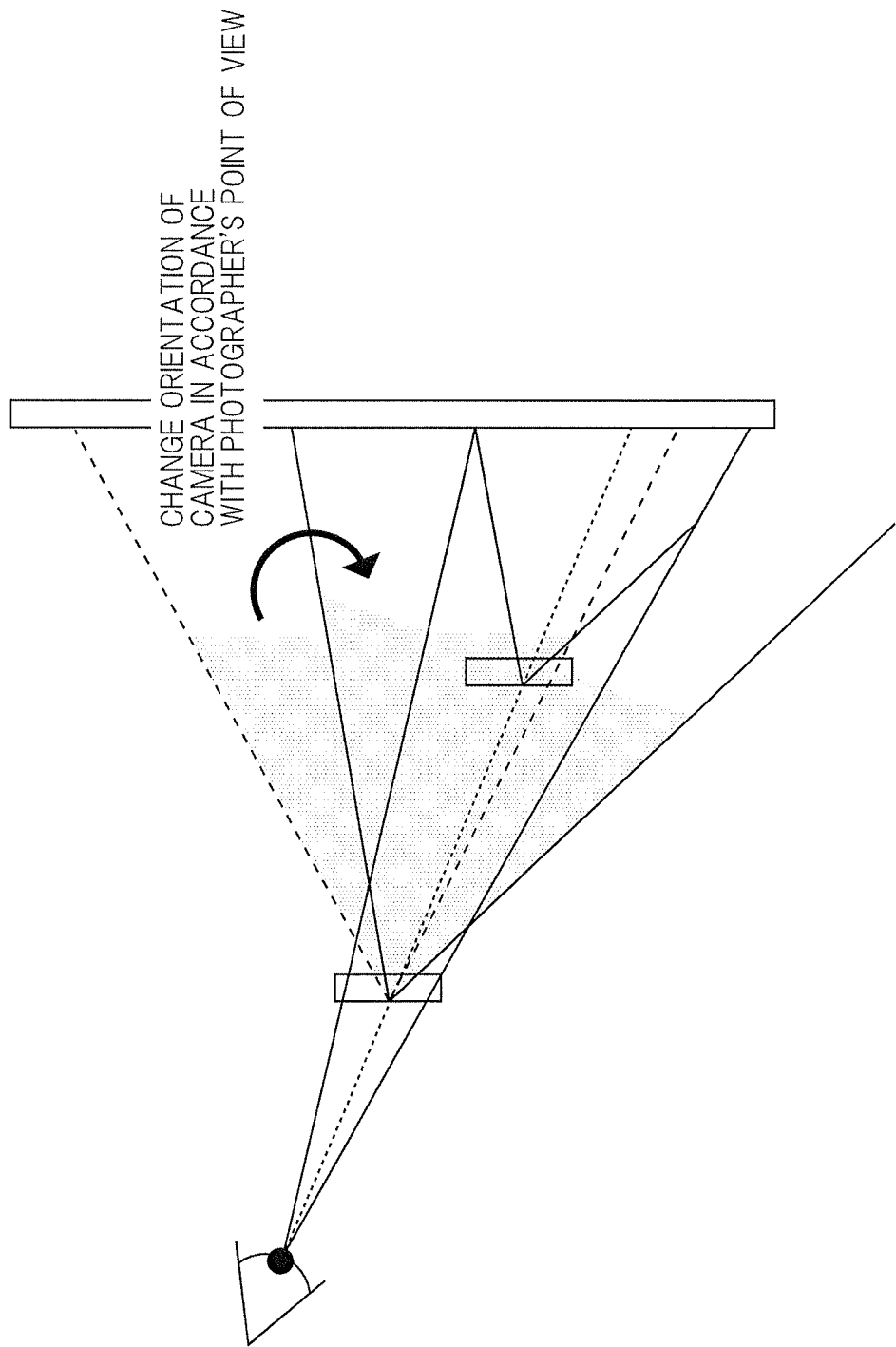

MOBILE TERMINAL, METHOD FOR ADJUSTING MAGNIFICATION OF CAMERA AND PROGRAM

TECHNICAL FIELD

The present invention relates to a mobile terminal, a method for adjusting the magnification of a camera and a program, and in particular, to a mobile terminal with a camera, a method for adjusting the magnification of the camera and a program.

BACKGROUND ART

Patent document 1 describes an image pickup device that controls a zoom magnification so as to achieve a constant image size of a subject. The image pickup device described in Patent document 1 includes extracting means that outputs a feature amount indicating the size of a subject and a storage section in which a predetermined reference value is stored.

The image pickup device described in Patent document 1 controls a zoom magnification so that the size of a subject indicated by a feature amount output from the extracting means becomes approximately equal to a predetermined reference value.

BACKGROUND ART DOCUMENTS

Patent Documents

Patent document 1: JP09-149311A

SUMMARY OF THE INVENTION

Problems to be Solved by the Invention

The image pickup device described in Patent document 1 controls a zoom magnification so as to achieve the constant image size of a subject. Thus, if a mobile terminal with a camera described in Patent document 1 picks up an image of an information board and displays the information board on a display screen, the information board displayed on the display screen may seem small to a photographer depending on his/her point of view.

Thus, disadvantageously, a photographer who shoots an image using a display screen may feel that it is difficult to see the image displayed on a display screen.

An object of the present invention is to provide a mobile terminal, a method for adjusting the magnification of a camera and a program that enable a photographer who shoots an image using a display screen to easily see an image displayed on the display screen.

Means for Solving the Problems

A mobile terminal according to the present invention is a mobile terminal including a camera and a display screen, the mobile terminal comprising: display control means that displays an image of an object picked up by the camera on the display screen; first measuring means that detects a photographer's eye position with respect to the display screen and measures a distance D1 from the eye position to the display screen; second measuring means that measures a distance D2 from the camera to the object; and adjusting means that adjusts a magnification of the camera on the basis of the distance D1 measured by the first measuring means and the distance D2 measured by the second measuring means.

A method for adjusting the magnification of a camera according to the present invention is a method for adjusting the magnification of a camera of a mobile terminal including the camera and a display screen, the method comprising: display control for displaying on the display screen an image of an object picked up by the camera is; first measuring in which a photographer's eye position with respect to the display screen is detected and a distance D1 from the eye position to the display screen is measured; second measuring in which a distance D2 from the camera to the object is measured; and adjusting the magnification of a camera on the basis of the distance D1 measured in the first measuring and the distance D2 measured in the second measuring.

A program according to the present invention is a program for causing a computer in a mobile terminal to perform: a display control procedure in which an image of an object picked up by the camera is displayed on the display screen; a first measuring procedure in which a photographer's eye position with respect to the display screen is detected and a measuring distance D1 from the eye position to the display screen; a second measuring procedure in which a distance D2 from the camera to the object is measured; and an adjusting procedure in which a magnification of the camera is adjusted on the basis of the distance D1 measured in said first measuring procedure and the distance D2 measured in said second measuring procedure.

Advantages of the Invention

According to the present invention, an image displayed on a display screen is enabled to become easy to see for a photographer who shoots an image using the display screen.

BRIEF DESCRIPTION OF THE DRAWINGS

FIG. 3 is a diagram for explaining a way of magnification adjustment for camera 110; and FIG. 4 is a diagram for explaining a way of magnification adjustment for camera 110 according to a second exemplary embodiment.

BEST MODE FOR CARRYING OUT THE INVENTION

Exemplary embodiments will now be described with reference to the drawings.

Figure 1:
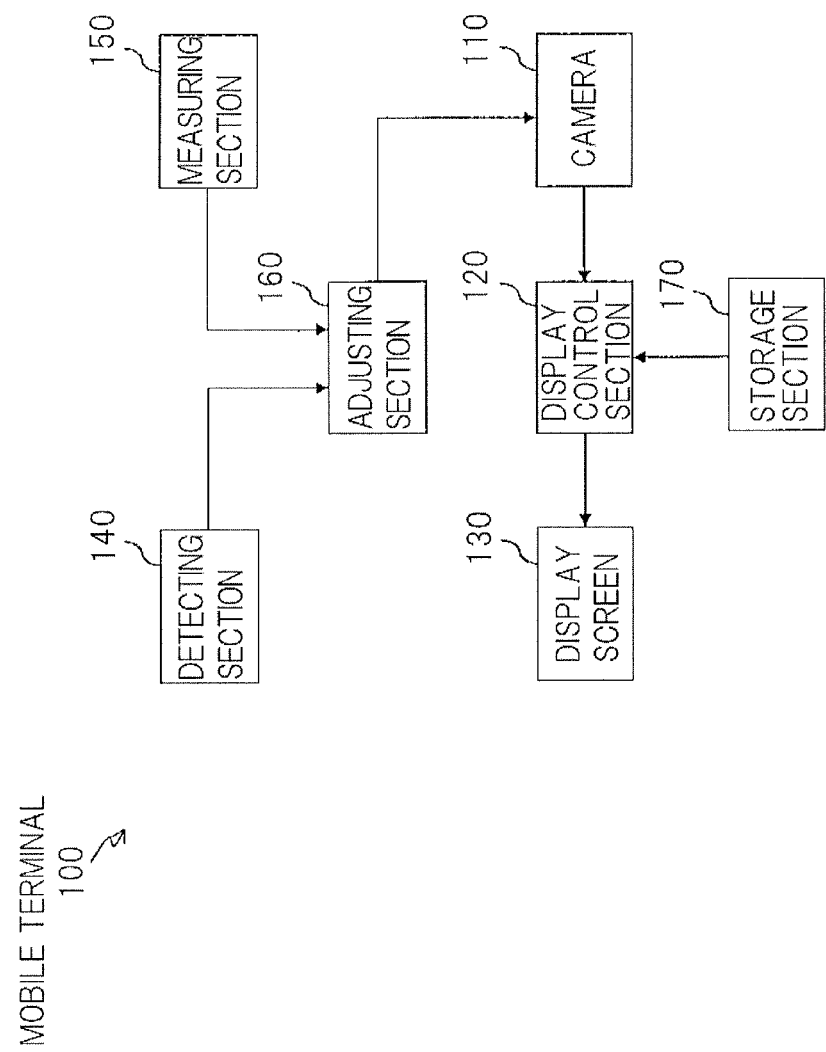
FIG. 1 is a block diagram illustrating an example of a configuration of a mobile terminal according to a first exemplary embodiment.

FIG. 1 is a block diagram illustrating an example of a configuration of a mobile terminal according to a first exemplary embodiment.

Mobile terminal 100 includes camera 110, display control section 120, display screen 130, detecting section 140, measuring section 150, adjusting section 160, and storage section 170. In this exemplary embodiment, mobile terminal 100 has a first housing including camera 110, display screen 130, detecting section 140, and measuring section 150 and a second housing including an operation button. A front surface of the first housing is provided with display screen 130 and detecting section 140, and a back surface of the first housing opposite to the front surface is provided with camera 110 and measuring section 150.

Camera 110 has a zoom function which can change a zoom magnification. Camera 110 picks up an image. Camera 110 picks up an image and outputs image signals indicating the picked-up image to display control section 120.

Display control section 120 may be generally referred to as display control means.

Display control section 120 displays an image picked up by camera 110 on display screen 130.

Figure 2A:
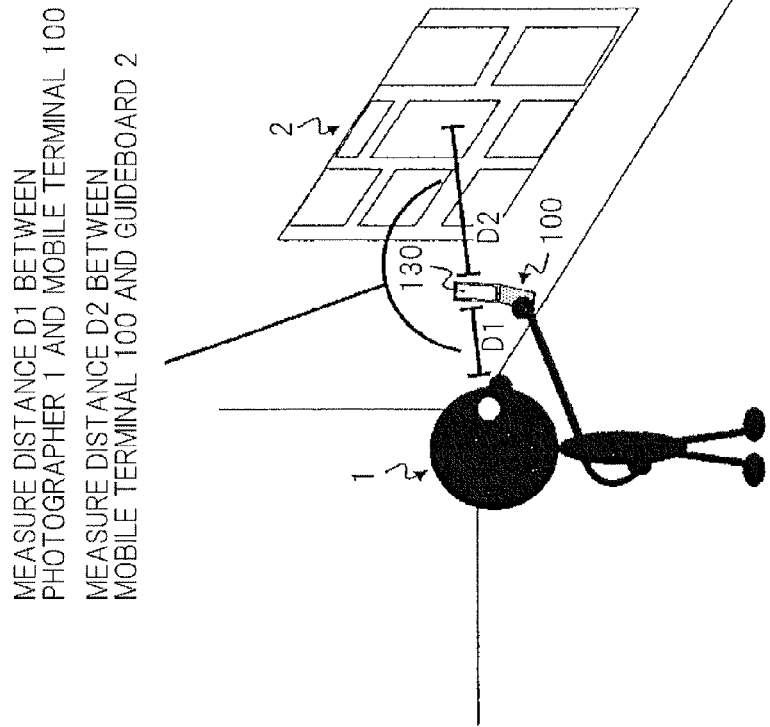
FIG. 2A is a diagram illustrating the situation in which a photographer shoots a guideboard using a display screen.

FIG. 2A is a diagram illustrating a situation in which photographer 1 shoots guideboard 2 using display screen 130. Guideboard 2 has thereon an AR (augmented reality) marker at a destination point that the photographer attempts to reach. Guideboard 2 may be generally referred to as an image-picked-up object. Also, the AR mark placed on guideboard 2 may be generally referred to as a predetermined mark.

In FIG. 2A, camera 110 of mobile terminal 100 picks up an image of guideboard 2, and display control section 120 illustrated in FIG. 1 displays guideboard 2, an image of which is picked up by camera 110, on display screen 130.

Detecting section 140 may be generally referred to as first measuring means.

Detecting section 140 detects an eye position of a photographer with respect to display screen 130. Detecting section 140 also measures a distance D1 from the photographer's eye position to display screen 130.

In this exemplary embodiment, a camera with a face recognition function is used as detecting section 140. Detecting section 140 picks up an image of a face of a photographer viewing display screen 130. Detecting section 140 stores therein, in advance, feature data indicating the features of the eyes of human beings, for example, and extracts features of a photographer's face, whose image is picked up by the camera used as detecting section 140. Detecting section 140 compares the extracted features with the features indicated by the feature data to detect the eye position of the photographer.

As illustrated in FIG. 2A, when detecting the eye position of the photographer, detecting section 140 of mobile terminal 100 measures distance D1 between the photographer's eye position and display screen 130 of mobile terminal 100. Detecting section 140 measures distance D1 by means of, for example, an autofocus function. Also, detecting section 140 may emit infrared rays, and then determine the time between the emission and the reception of the infrared rays reflected by a photographer, thereby measuring distance D1.

Measuring section 150 illustrated in FIG. 1 may be generally referred to as second measuring means.

Measuring section 150 measures a distance D2 from camera 110 to a guideboard.

For example, first, measuring section 150 emits infrared rays, and then determines the time between the emission and the reception of the infrared rays reflected by guideboard 2, thereby measuring distance D2. Note that camera 110 may also be used as measuring section 150. If camera 110 is used as measuring section 150, measuring section 150 measures distance D2 by means of the autofocus function of camera 110.

Adjusting section 160 may be generally referred to as adjusting means.

Adjusting section 160 adjusts the magnification of camera 110 on the basis of distance D1 measured by detecting section 140 and the distance D2 measured by measuring section 150.

FIG. 3 is a diagram for explaining how adjusting section 160 adjusts magnification adjustment camera 110.

In FIG. 3, adjusting section 160 calculates width S (hereinafter, referred to as "image pick-up width") in which guideboard 2 is obstructed from view by display screen 130, using distance D1 measured by detecting section 140, distance D2 measured by measuring section 150, and screen width W of display screen 130 of mobile terminal 100.

Adjusting section 160 calculates image pick-up width S in accordance with the following equation, for example.

$S=W(D1+D2)/D1$

Adjusting section 160 calculates image pick-up width S on the basis of the foregoing equation and then adjusts the magnification of camera 110 so that camera 110 picks up an image of the range of image pick-up width S. Also, distance D3 from the position of camera 110 for picking up an image within image pick-up width S to guideboard 2 can be expressed by the following equation in which image pick-up width S and the angle of view θ of camera 110 are used.

$D3=S/\tan(\theta/2)$

Thus, magnification m of camera 110 can expressed as:

$m=D2/D3=D1\times D2\times\tan(\theta/2)/(W(D1+D2))$ $m=k\times D1\times D2/(D1+D2)$, where k is expressed by "$\tan(\theta/2)/W$."

According to the foregoing equations, adjusting section 160 divides a multiplication value obtained by multiplying distance D1 by distance D2, by an addition value obtained by adding distance D1 to distance D2. Adjusting section 160 adjusts the magnification of camera 110 on the basis of the calculated value $(D1\times D2/(D1+D2))$ obtained by dividing the multiplication value by the addition value. Adjusting section 160 raises the magnification of camera 110 as the calculated value becomes larger.

It should be noted that when the magnification of camera 110 in a horizontal direction is adjusted using image pick-up width S, the magnification in a vertical direction is also adjusted. Adjusting section 160 adjusts the magnification of camera 110 any time there is a change in distance D1 measured by detecting section 140 or a change in distance D2 measured by measuring section 150.

Storage section 170 may be generally referred to as storage means.

Storage section 170 stores therein marker information indicating an AR mark placed on a guideboard and addition information about a building indicated at a position of the AR marker in association with each other as association information. The addition information indicates a star symbol displayed at the position of the AR marker and a route to the AR marker's position. The addition information may be generally referred to as specific information. It should be noted that the association information may be obtained through a wireless LAN (Local Area Network) communications, for example and stored in storage section 170.

When detecting an AR marker indicated by marker information in guideboard 2, an image of which is picked up by camera 110, display control section 120 displays addition information stored in storage section 170 on display screen 130. For example, display control section 120 displays a star symbol indicated in addition information at a position where an AR marker in display screen 130 is detected.

For example, after adjusting section 160 adjusts the magnification of camera 110, when receiving image signals from camera 110, display control section 120 compares a guideboard indicated by the image signals with an AR mark indicated by marker information to detect the AR marker in the guideboard. When detecting the AR marker in the guideboard, display control section 120 superimposes (or combines) the guideboard indicated by the image signals and a star symbol indicated by addition information on (or with) each other and displays a resultant image on display screen 130.

Figure 2B:
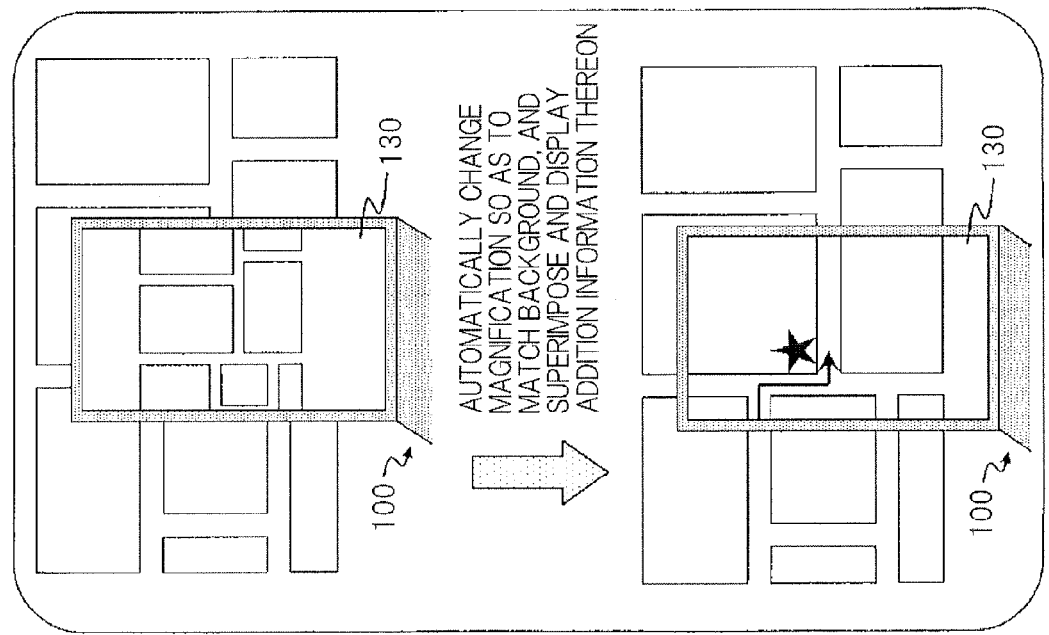
FIG. 2B is a diagram illustrating an example of adjusting the magnification of camera 110.

FIG. 2B is a diagram illustrating the situation in which adjusting section 160 adjusts the magnification of camera 110. As illustrated in FIG. 2B, mobile terminal 100 changes the magnification of camera 110 so that guideboard 2 displayed on display screen 130 matches the background viewed from the photographer. Mobile terminal 100 further superimposes addition information related to guideboard 2 on display screen 130.

Mobile terminal 100 may be implemented by a computer. In this case, such a computer reads and executes a program recorded in a recording medium such as a computer-readable CD-ROM (compact disk read-only memory), thereby functioning as camera 110, display control section 120, display screen 130, detecting section 140, measuring section 150, adjusting section 160 and storage section 170. The recording medium may be changed as needed, and in not limited to a CD-ROM.

According to the this exemplary embodiment, in mobile terminal 100 for displaying on display screen 130 a guideboard that is an object whose image is picked up by camera 110, detecting section 140 detects the eye position of a photographer with respect to display screen 130 and measures distance D1 from the eye position to display screen 130. Then, measuring section 150 measures distance D2 from camera 110 to the guideboard. Adjusting section 160 adjusts the magnification of camera 110 on the basis of distance D1 measured by detecting section 140 and distance D2 measured by measuring section 150.

Specifically, adjusting section 160 divides a multiplication value obtained by multiplying distance D1 by the distance D2, by an addition value obtained by adding distance D1 to distance D2. Then, adjusting section 160 adjusts the magnification of camera 110 on the basis of the resultant calculated value obtained by dividing the multiplication value by the addition value. In this exemplary embodiment, adjusting section 160 raises the magnification of camera 110 as the calculated value becomes larger.

Since mobile terminal 100 adjusts the magnification of camera 110 on the basis of distance D1 from the eye position of a photographer to display screen 130 and distance D2 from camera 110 to a guideboard, camera 110 is enabled to pick up the image of an area that display screen 130 is preventing a photographer from viewing. Thus, mobile terminal 100 is enabled to display on display screen 130 the area of the guideboard that display screen 130 is preventing the photographer from viewing.

As illustrated in FIG. 2B, since a guideboard image smaller than the guideboard around mobile terminal 100, seen by the photographer, is not displayed on display screen 130, mobile terminal 100 can make an image displayed on display screen 130 conform to a scene from the photographer. Thus, if seeing the guideboard through display screen 130, the photographer can see the entire guideboard without being caught by a sense of discomfort, that is, the photographer can view the entire guideboard as if he/she looks at a scene through display screen 130.

Therefore, according to the this exemplary embodiment, mobile terminal 100 enables a photographer who shoots an image using display screen 130 to easily see an image displayed on display screen 130 can be provided. Also, even if the photographer does not wear a device such as a sensor, mobile terminal 100 can properly adjust the magnification of camera 110 depending on the eye position of the photographer with respect to display screen 130. Further, mobile terminal 100 can provide an image that matches with a scene outside display screen 130 without it being necessary for the photographer to adjust the magnification of camera 110.

In this exemplary embodiment, an AR mark is placed on a guideboard as a predetermined mark, and storage section 170 stores therein the AR marker and addition information (specific information) in association with each other. When detecting the AR mark in a guideboard, an image of which is picked up by camera 110, display control section 120 displays the addition information in storage section 170 on display screen 130.

Thus, in the situation where mobile terminal 100 adjusts the magnification of camera 110, thereafter detecting an AR mark placed in a guideboard and displaying addition information on display screen 130, mobile terminal 100 can display on display screen 130 the addition information without the photographer experiencing any sense of discomfort.

Next, a second exemplary embodiment will be described. A basic configuration of the second exemplary embodiment is similar to that of the first exemplary embodiment. In the second exemplary embodiment, camera 110 has a panning function and a tilting function.

FIG. 4 is a diagram for explaining how to adjust of magnification for camera 110 according to the second exemplary embodiment.

In FIG. 4, once detecting section 140 detects the eye position of the photographer, adjusting section 160 sets an orientation of camera 110 on the basis of the eye position detected by detecting section 140.

In the exemplary embodiment, adjusting section 160 sets the orientation of camera 110 to a direction opposite to the direction of the center of display screen 130 from the eye position of the photographer. As shown in FIG. 4, adjusting section 160 changes the orientation of camera 110 so that the photographer's line of sight bisects the angle of view of camera 110.

Thus, mobile terminal 100 can adjust the orientation of camera 110 in accordance with the photographer's line of sight. Accordingly, mobile terminal 100 is enabled to display an image that is easy to see for a photographer on display screen 130 depending on the photographer's line of sight.

In the embodiments hereinbefore described, the configurations illustrated in the drawings are merely examples and the present invention shall not be limited thereto.

DESCRIPTION OF THE SIGNS

100 MOBILE TERMINAL
110 CAMERA
120 DISPLAY CONTROL SECTION
130 DISPLAY SCREEN
140 DETECTING SECTION
150 MEASURING SECTION
160 ADJUSTING SECTION
170 STORAGE SECTION

What is claimed is:

1. A mobile terminal including a camera and a display screen, the mobile terminal comprising:
  a display control means that displays an image of an object picked up by the camera on the display screen;
  a first measuring means that detects a photographer's eye position with respect to the display screen and measures a distance D1 from the eye position to the display screen;
  a second measuring means that measures a distance D2 from the camera to the object; and adjusting means that adjusts a magnification of the camera on the basis of the distance D1 measured by said first measuring means and the distance D2 measured by said second measuring means, wherein said adjusting means divides a multiplication value obtained by multiplying the distance D1 by the distance D2, by an addition value obtained by adding the distance D1 to the distance D2 and adjusts the magnification of the camera on the basis of a calculated value obtained by dividing the multiplication value by the addition value.

2. The mobile terminal according to claim 1, wherein said adjusting means increases the magnification of the camera as the calculated value becomes larger.

3. The mobile terminal according to claim 1, further comprising storage means, wherein the object is a guideboard on which a predetermined mark is placed, said storage means stores therein the predetermined mark and specific information in association with each other, and said display control means displays the specific information on the display screen when said display control means detects the predetermined mark in the guideboard, an image of which is picked up by the camera.

4. The mobile terminal according to claim 1, wherein the camera has a panning function and a tilting function, and said adjusting means sets an orientation of the camera on the basis of an eye position detected by said first measuring means.

5. A method for adjusting a magnification of a camera of a mobile terminal including the camera and a display screen, the method comprising:

display control for displaying on the display screen an image of an object picked up by the camera;

measuring a first measurement in which a photographer's eye position with respect to the display screen is detected and a distance D1 from the eye position to the display screen is measured;

measuring a second measurement in which a distance D2 from the camera to the object is measured; and adjusting a magnification of the camera on the basis of the distance D1 measured in said first measurement and the distance D2 measured in said second measurement, wherein in said adjusting, a multiplication value obtained by multiplying the distance D1 by the distance D2 is divided by an addition value obtained by adding the distance D1 to the distance D2 and the magnification of the camera is adjusted on the basis of a calculated value obtained by dividing the multiplication value by the addition value.

6. A mobile terminal including a camera and a display screen, the mobile terminal comprising:

display control means that displays an image of an object picked up by the camera on the display screen;

a first measuring means that detects a photographer's eye position with respect to the display screen and measures a distance D1 from the eye position to the display screen;

a second measuring means that measures a distance D2 from the camera to the object; and adjusting means that adjusts a magnification of the camera on the basis of the distance D1 measured by said first measuring means and the distance D2 measured by said second measuring means, wherein the object is a guideboard on which a predetermined mark is placed, said storage means stores therein the predetermined mark and specific information in association with each other, and said display control means displays the specific information on the display screen when said display control means detects the predetermined mark in the guideboard, an image of which is picked up by the camera.

* * * * *